UNITED STATES PATENT OFFICE.

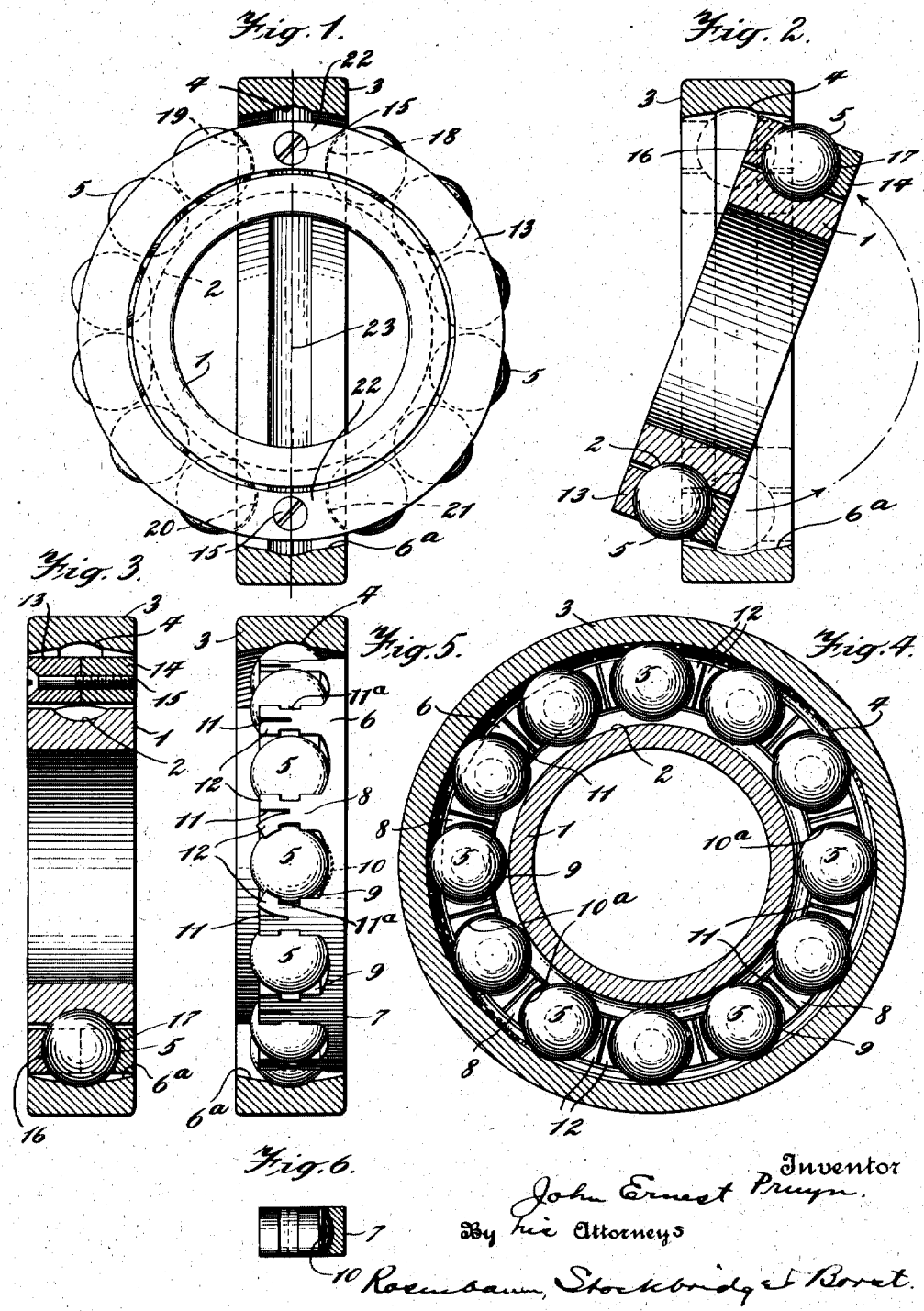

JOHN ERNEST PRUYN, OF PHILADELPHIA, PENNSYLVANIA, ASSIGNOR OF ONE-HALF TO EMILY C. PRUYN, OF PHILADELPHIA, PENNSYLVANIA.

RADIAL BALL-BEARING.

1,281,244.  Specification of Letters Patent.  Patented Oct. 8, 1918.

Application filed September 13, 1916. Serial No. 119,806.

*To all whom it may concern:*

Be it known that I, JOHN ERNEST PRUYN, a citizen of the United States, residing at Philadelphia, in the county of Philadelphia, and State of Pennsylvania, have invented certain new and useful Improvements in Radial Ball-Bearings, of which the following is a full, clear, and exact description.

My invention is designed for the production of an improved ball bearing of the radial type, which shall have all of the advantages of construction and operation of old forms of such bearings and none of the disadvantages thereof. The bearing is a unitary device. It comprises an integral inner ring, an integral outer ring with grooves or raceways in the opposing surfaces of said rings, and balls fitting within said grooves of greater diameter than the space between said rings outside said grooves. The two rings are concentric, the opposing surfaces thereof are homogeneous and the grooves or raceways therein are continuous and uninterrupted throughout their circumference. The number of balls within the grooves or raceways is greater than can be introduced by the eccentric displacement of the two rings, preferably occupying not less than eighty per cent. of the total ball capacity of the grooves. And the rings and balls are wholly undistorted during the operation of assembling the parts of the bearing.

The details of the invention will hereinafter appear and the novel features thereof will be set forth in the claim.

My improved bearing has been illustrated in connection with the method of assembling the same.

In the drawing:

Figure 1 is a sectional elevation of the outer and inner bearing rings, with the balls and temporary retainer therefor, the parts being shown in the positions in which they are placed at the beginning of the assembling operation;

Fig. 2 is a section at right angles to Fig. 1, showing the parts as they approach the completion of the assembling operation;

Fig. 3 is an irregular section showing the parts assembled, prior to the removal of the temporary ball retainer;

Fig. 4 is a sectional plan view of the bearing with the ball separator in place;

Fig. 5 is a section at right angles to Fig. 4 showing the edge or periphery of the separator in elevation; and Fig. 6 is a sectional detail view.

Like reference numerals indicate like parts in the different views.

My improved bearing comprises an inner ring 1, having an annular groove 2 in its outer periphery, an outer ring 3 having an annular groove 4 on its inner periphery, a series of balls 5, and a ball separator 6. When these parts are completely assembled, the bearing constitutes a unitary device, all of the parts being interlocked so that they are incapable of separation in ordinary use. The rings 1 and 3 of the bearing are concentric, as shown, and both are composed of extremely hard steel in order to properly sustain the wear to which the bearing is subjected. The grooves 2 and 4 form the raceway for the balls 5, the said grooves being uninterrupted throughout their circumference, and overhanging a portion of the balls, so that in the completed bearing the balls are incapable of accidental displacement or removal from the raceway. As the grooves 2 and 4 overhang a portion of the balls 5, it follows that the distance between the rings 1 and 3, on opposite sides of the grooves 2 and 4, is less than the diameter of the balls 5. The inner surface of the outer ring 3 on both sides of the groove 4 therein, is spherical, as shown at 6ª, the center of the sphere upon which said surface is formed being coincident with the center of the bearing, that is, coincident with the axis of the bearing and in the plane of the centers of the balls 5. The number of balls employed is as large as the raceway will hold in connection with a separator of sufficient strength to withstand the strain to which the bearing is subjected. The number of balls is greater than can be inserted into the raceway by an eccentric displacement of the rings 1 and 3, and is preferably not less than 80% of the total ball capacity of said raceway.

The separator 6 is preferably constructed from a single piece of metal. It is annular in form, comprising a flat base 7 having a series of upwardly-extending ribs 8 thereon forming between them the pockets 9 in which the balls 5 fit. The number of the pockets 9 corresponds with the number of the balls employed. Each of the pockets 9 is formed with a recess 10 in the bottom thereof, and the sides of said pockets are concaved, as shown at 10ª, by forming cylindrical surfaces on the sides of the ribs 8. The balls fit loosely within the pockets 9, with their inner and outer portions projecting radially from opposite sides of the separator, but are held equally spaced from each other by the ribs 8 of said separator. Due to the concaved surfaces 10ª on the ribs 8, the pockets 9 are narrower on opposite sides of the separator, than the diameter of the balls 5, so that the balls may enter the pockets 9 only through the ends thereof, and so that when in said pockets the balls are held against movement in any direction except that in which they were introduced. The ends of the ribs 8 of the separator are radially split or divided, as by saw kerfs 11, forming the branches or bifurcations 12, and the sides of said ribs are notched or otherwise weakened in line with the centers of the balls 5, as shown at 11ª. The ends of said ribs are thus adapted to be spread apart or separated in order to close the entrances to the pockets 9 through which the balls are admitted, and to lock the separator and the balls to each other. When the bearing rings 1 and 3 and the balls 5 have been assembled, in the manner to be described later, the bearing is completed by connecting up the separator 6 with these parts. The separator is inserted into the annular space between the rings 1 and 3, with the balls 5 fitting, respectively, in the pockets 9 of said separator. This may be readily done, for it will be remembered that the balls are free to enter the pockets 9 through the ends of the latter, and, the width of the annular base 7 of the separator being less than that of the annular space between the rings 1 and 3, the said base is free to pass between said rings. In order to permanently connect the separator 6 with the remaining portions of the bearing, to produce a unitary structure, the bifurcated ends of the ribs 8 of the separator are spread so that the branches 12 thereof on opposite sides of the pockets 9 are caused to approach each other, until the original entrance openings into said pockets are contracted to less than the diameters of the balls therein. Thus, the separator 6 is locked to the remaining parts of the bearing by the engagement of the bent ends 12 of the ribs 8 with the balls 5, and is prevented from being removed in the manner in which it was introduced into the space between the rings 1 and 3. The balls 5 occupying substantially 80% of the space between the rings 1 and 3, are thus held in equally spaced relation with each other so as to equalize the load on the different balls of the bearing.

Radial ball bearings of this general character have heretofore been devised and put into commercial use, but in the production of such bearings, prior inventors have sacrificed one or another feature of construction or advantage which experience has recognized as essential. For example, it has been proposed to make a radial bearing of two concentric rings having raceway grooves therein, balls fitting within said grooves and a separator for the balls, the said rings being integral, and the grooves overhanging the balls so that a unitary structure is produced. Such bearing is assembled by introducing the balls between the rings into a crescent-shaped space caused by the eccentric displacement of the rings and using a separator to hold the balls widely spaced apart. This bearing, while embodying many of the features of advantage of my bearing, is defective in that the full complement of balls cannot be used. The greatest number of balls that can be employed in such a bearing is but little over 50% of the total ball capacity of the bearing. This reduction in the number of balls is made at the expense of the strength and durability of the bearing. Another old form of radial bearing is one comprising two concentric rings with balls between them, the raceway grooves in the rings overhanging the balls, and a separator, the parts of the device being assembled by pressure resulting in the stretching and distortion of the parts. A bearing thus constructed is deficient for the reason that the rings cannot be made of that quality of steel which has the requisite degree of hardness, for use in a ball bearing, and for the further reason that the distortion of the metal of the rings necessarily weakens the same. While the full number of balls may be employed in this form of bearing,—an advantage over the other bearing referred to,—strength and durability of the bearing have been sacrificed for this advantage. A third form of radial bearing in which the full complement of balls is employed, but which has other defects, is one in which the balls are introduced into the overhanging raceway grooves between the two bearing rings through filling openings in one or both of the rings running nearly to the depth of the groove and through which the balls are introduced one at a time, the openings in such bearings being sometimes plugged up afterward. The disadvantage of this construction is obviously that a weak point in the bearing surface along which the balls travel is left and in which one of the balls is apt to become wedged.

By my invention, I aim to produce a bearing which has all of the advantages of the old types of radial bearings referred to, with none of the disadvantages thereof. In so doing, I employ overhanging raceway grooves in the two concentric rings and thereby produce a unitary device, I employ the full complement of balls, I dispense with filling openings, and I do not distort and thereby weaken the material of the rings during the assembling operation.

To facilitate the assembling of the parts of the bearing, I employ a temporary ball retainer or clamp for holding the balls 5 in the groove 2 of the inner ring 1 in one or more groups so that the inner ring with the balls connected therewith may be readily passed into the outer ring 3 at right angles to the latter. This retainer or clamp may be of any suitable construction. As shown, it is made up of the two rings 13, 14 secured to each other by the screws 15. The ring 13 is provided on its inner face with a groove 16 and the ring 14 is provided on its inner face with a similar groove 17. The grooves 16, 17 terminate on opposite sides of the respective rings in shoulders 18, 19, 20 and 21 forming the solid portions 22 through which the screws 15 pass. By this construction it will be seen that when the ball clamp or retainer is in place, the balls 5 are locked in the groove 2 in the ring 1, are held in the bottom of said groove, and are separated into two groups on opposite sides of the solid portions 22, each of said groups containing half the balls to be used in the finished bearing. With the balls separated in groups, as shown and described, the distance across the assembled inner ring and balls is less along the line 23 through the solid portion 22 than at any other point.

In assembling my improved bearing, the outer member or ring 3 is heated to the point at which the temper is drawn, and thereby expanded. The balls 5 are placed about the inner ring 1 and held there by the temporary ball retainer or clamp 13, 14. This inner member or unit comprising the inner ring, the balls and the temporary ball retainer, is then chilled so as to contract it as much as possible. When the various parts have acquired the proper temperatures, the inner member is placed at right angles to the outer member and moved to the interior of the outer member until the center thereof coincides with the center of the outer member as shown in Fig. 1. This movement is rendered possible by the separation of the balls 5 into groups, as described, and the bringing of the solid portions 22 of the ball retainer into conincidence with the diameter of the outer member. The inner member is then given a partial turn until the balls 5 thereon almost engage the inner surface of the outer member as shown in Fig. 2 and then the inner member is swung into its proper final position as shown in Fig. 3. In assembling, the rings 1 and 3 are not eccentrically displaced with respect to each other. In fact the center of the inner ring must be maintained at the center of the outer ring, because if the two rings are only slightly displaced eccentrically, undue pressure must be used to assemble them. As the ring 1 with the balls 5 attached thereto is turned during the assembling operation with its geometric center coincident with the geometric center of the outer ring 3, upon which center the spherical curvature of the inner surface $6^a$ of the outer ring is generated, the balls 5 on the inner ring ride upon the inclined spherical surface $6^a$ of the outer ring 3 outside the groove 4 therein, but do not rub or abrade said outer ring or distort or stretch it in any way. This result is obtained partially by the formation of the spherical surface $6^a$ on the outer ring 3 and partially by the expansion of the outer ring and contraction of the inner ring, due to the different temperatures employed in assembling. The depth of the groove 4 should correspond with the degree of expansion of the outer ring 3 when subjected to heat, so that the balls will be free to pass over the spherical surface $6^a$ of the outer ring without rubbing or abrading it, and yet will be partially inclosed by the groove 4 in the ring 3 when the parts have resumed their normal temperatures and positions.

I claim:—

A radial ball bearing comprising two concentric rings having annular grooves in their opposing faces, balls in said grooves and a separator for the balls, the whole constituting a unitary structure, the separator comprising a base having a series of ribs extending therefrom forming pockets for the balls, the sides of said ribs being notched in line with the centers of the balls, and the ends thereof being radially slitted, the branches thus formed being spread apart to contract the mouths of said pockets and lock the separator to the balls.

In witness whereof I subscribe my signature, in the presence of two witnesses.

JOHN ERNEST PRUYN.

Witnesses:
WM. M. STOCKBRIDGE,
WALDO M. CHAPIN.